US010052675B2

(12) United States Patent
Namekawa et al.

(10) Patent No.: US 10,052,675 B2
(45) Date of Patent: Aug. 21, 2018

(54) METHOD OF MANUFACTURING TWO-PIECE FOOD CAN

(71) Applicant: DAIWA CAN COMPANY, Tokyo (JP)

(72) Inventors: Hiroko Namekawa, Kanagawa (JP); Koichiro Nakamura, Kanagawa (JP); Shigeru Noto, Kanagawa (JP); Yuichiro Murayama, Kanagawa (JP); Chiharu Nabeta, Kanagawa (JP); Tomohiko Oyanagi, Kanagawa (JP)

(73) Assignee: DAIWA CAN COMPANY, Tokyo (JP)

( * ) Notice: Subject to any disclaimer, the term of this patent is extended or adjusted under 35 U.S.C. 154(b) by 208 days.

(21) Appl. No.: 15/021,146

(22) PCT Filed: Sep. 11, 2013

(86) PCT No.: PCT/JP2013/074505
§ 371 (c)(1),
(2) Date: Mar. 10, 2016

(87) PCT Pub. No.: WO2015/037074
PCT Pub. Date: Mar. 19, 2015

(65) Prior Publication Data
US 2016/0221064 A1 Aug. 4, 2016

(51) Int. Cl.
*B21D 51/26* (2006.01)
*B21D 22/20* (2006.01)
(Continued)

(52) U.S. Cl.
CPC ............ *B21D 51/26* (2013.01); *B21D 22/208* (2013.01); *B21D 22/28* (2013.01);
(Continued)

(58) Field of Classification Search
CPC ............... B21D 51/26; B21D 51/2607; B21D 51/2661; B21D 22/28; B21D 22/208;
(Continued)

(56) References Cited

U.S. PATENT DOCUMENTS 4,264,017 A * 4/1981 Karas .................. B21D 51/26
206/509
5,072,605 A * 12/1991 Imazu .................. B21D 51/26
72/347
(Continued)

FOREIGN PATENT DOCUMENTS

JP     4300038 A2    10/1992
JP     9249755 A2     9/1997
(Continued)

OTHER PUBLICATIONS

Packaging Strategies, Eggs packaged in aerosol can, Apr. 9, 2012.*
(Continued)

*Primary Examiner* — Pradeep C Battula
(74) *Attorney, Agent, or Firm* — Rankin, Hill & Clark LLP

(57) ABSTRACT

A method of manufacturing a two-piece food can having improved corrosion resistance is provided, wherein the two-piece food can using a metal sheet coated with a thermoplastic resin and having annular uneven beads and/or a bottom rim. After forming a bottomed cylindrical can body by drawing and ironing, by heating at a temperature higher than the melting temperature of the thermoplastic resin for a predetermined time before forming uneven beads and/or a bottom rim to the can body and quenching within a predetermined time after heating, the inner resin coating hardly peel off during the following formation of uneven beads and/or the bottom rim. As a result, a two-piece food can having excellent corrosion resistance may be obtained.

11 Claims, 3 Drawing Sheets

(51) Int. Cl.
  *B65D 1/28* (2006.01)
  *B21D 22/28* (2006.01)
  *B32B 15/08* (2006.01)
  *B32B 15/18* (2006.01)
  *B32B 15/20* (2006.01)
  *B65D 1/16* (2006.01)
  *B32B 15/09* (2006.01)
  *B32B 27/32* (2006.01)
  *B32B 27/34* (2006.01)
  *B32B 27/36* (2006.01)
  *B32B 1/08* (2006.01)
  *B32B 3/28* (2006.01)
  *C09D 5/00* (2006.01)

(52) U.S. Cl.
  CPC ............ *B21D 51/2607* (2013.01); *B32B 1/08* (2013.01); *B32B 3/28* (2013.01); *B32B 15/08* (2013.01); *B32B 15/09* (2013.01); *B32B 15/18* (2013.01); *B32B 15/20* (2013.01); *B32B 27/32* (2013.01); *B32B 27/34* (2013.01); *B32B 27/36* (2013.01); *B32B 27/365* (2013.01); *B65D 1/165* (2013.01); *B65D 1/28* (2013.01); *C09D 5/00* (2013.01); *B32B 2255/06* (2013.01); *B32B 2255/26* (2013.01); *B32B 2270/00* (2013.01); *B32B 2307/31* (2013.01); *B32B 2307/714* (2013.01); *B32B 2307/732* (2013.01); *B32B 2439/70* (2013.01)

(58) Field of Classification Search
  CPC ........ B21D 22/201; B65D 1/28; B65D 1/165; B32B 2439/66; B32B 2439/70
  See application file for complete search history.

(56) References Cited

U.S. PATENT DOCUMENTS 5,653,357 A * 8/1997 Miyazawa ............. B21D 51/26
  220/62.11
8,286,459 B2 * 10/2012 Kubo ..................... B21D 51/26
  72/348

FOREIGN PATENT DOCUMENTS

JP  2001262370 A2  9/2001
JP  2001276946 A2  10/2001
JP  WO 2007020948 A1 *  2/2007  ............. B21D 51/26

OTHER PUBLICATIONS

Sekerka et al, Ion selective electrode for determination of chloride ion biological materials, food porducts, soils and waste water, Nov. 1978.*
International Search Report dated Dec. 10, 2013 filed in PCT/JP2013/074505.

* cited by examiner

METHOD OF MANUFACTURING TWO-PIECE FOOD CAN

FIELD OF THE INVENTION

The present invention relates to a method of manufacturing a two-piece food can, and particularly in the two-piece food can using a thermoplastic resin-coated metal sheet and having annular uneven beads and/or a bottom rim, relates to a method of manufacturing a two-piece food can having improved corrosion resistance by preventing the inner resin coating to peel off during formation.

BACKGROUND OF THE INVENTION

Conventionally, so-called two-piece cans are manufactured by punching aluminum or steel metal sheets used for can manufacturing, drawing and ironing to form a bottomed cylindrical can body, and after filling the can body with beverage or food, an upper lid is mounted thereto and seamed to seal hermetically. Here, to prevent corrosion caused by the contact of the can and the beverage or food contained inside, usually, the inner face of the can is protected by coating or applying a resin to the surface of metal sheet. However, in metal sheets that are coated or applied with such resin, since a large force is applied to the metal surface being the inner face at drawing and ironing during formation of a two-piece can, resin coatings peel off, and the beverage or food may reach the metal surface from the peeled area and cause corrosion.

On the other hand, recently, from environmental considerations for resource savings, thinning of can bodies is strongly desired. Accordingly, to maintain sufficient intensity for thinned can body, annular uneven beads are provided onto can body parts. Moreover, in two-piece cans, since the upper lid is mounted onto the upper end face of the can body and seamed, the outer peripheral diameter of the upper lid will be larger than the outer peripheral diameter of the can body part or the bottom part, unless specific treatment such as neck-in processing is applied. Further, as cans cannot be arranged efficiently and neatly when cans have such deviations in their outer peripheral diameters, efficiency for manufacturing, transportation or selling will be poor. Therefore, so-called bottom rims are formed, which makes the outer peripheral diameter of the bottom face of the can the same as the outer peripheral diameter of the upper lid by pressing and extending the outer periphery of the bottom of the can outwards. However, when uneven beads or bottom rims are formed after drawing and ironing, since not only adhesion of the coating resins are lowered, but also the state of the surface coating will be damaged. Therefore, corrosion is likely occur. Further, when it is used for food cans which contain more salt, corrosion is likely to occur immediately when only a small amount of the resin layer peel off.

To these problems, for example, in Patent Literature 1, before and after performing the processes to the can body, by quenching after heating the resin-coated metal sheet to the melting point of the resin or higher, the resin becomes amorphous and adhesion of the metal sheet surface and the resin are enhanced to prevent peeling off of the resin layer, such that corrosion resistance and impact resistance are improved. However, the method disclosed in Patent Literature 1 is aimed at forming process of a two-piece bottle type cans for containing beverage, and it could not be said that is suitable for manufacturing a two-piece food cans having uneven beads and bottom rims.

PATENT LITERATURE

Patent Literature 1: Japanese Unexamined Patent Application Publication No. 2001-276946.

DISCLOSURE OF THE INVENTION

Problem to be Solved by the Invention

The present invention is to solve the problems of the conventional technique described above. The purpose of the present invention is to provide a method of manufacturing a two-piece food can having improved corrosion resistance, wherein the two-piece food can uses a thermoplastic resin-coated metal sheet and has annular uneven beads and/or bottom rims.

Means to Solve the Problem

As a result of diligent study in view of the problems in the conventional technique, the inventors have achieved the present invention. That is, in manufacturing of a two-piece food can using a thermoplastic resin-coated metal sheet, after forming a bottomed cylindrical can body by drawing and ironing, by adding processes of heating at a temperature higher than the melting temperature of the thermoplastic resin for a predetermined time before forming uneven beads and/or a bottom rim to the can body and quenching within a predetermined time after heating, the inner resin coating hardly peel off during the following formation of uneven beads and/or the bottom rim. As a result, the inventors found that a two-piece food can having excellent corrosion resistance may be obtained in this way.

That is, a method of manufacturing a two-piece food can according to the present invention is a method of manufacturing a two-piece food can that is obtained by using a thermoplastic resin-coated metal sheet and has uneven beads and/or a bottom rim formed onto the can body, wherein the method comprises;

(i) a can body forming process of punching the metal sheet that thermoplastic resin is coated at least on one side into an approximately circular shape, drawing and ironing the metal sheet such that the resin-coated surface becomes the inner surface, and forming a bottomed cylindrical can body that the body part and the bottom part are formed integrally, (ii) a heating process of heating the bottomed cylindrical can body formed by the above-described process and holding the surface temperature of the can body at the melting temperature of the thermoplastic resin or higher for at least 20 seconds or more, (iii) after the heating process, a quenching process of cooling the can body such that the surface temperature of the can body is Y ° C. or lower at least within X seconds represented by the formula shown below, $$X(\text{second(s)}) = (T_{peak}(° C.) - Y(° C.))/5$$

$T_{peak}(° C.)$: the highest temperature of the can body surface at the heating process $Y(° C.)$: the crystallization ending temperature of the thermoplastic resin (iv) a bead forming process of forming one or more annular uneven beads around its whole circumference of the side surface of the body part of the can body after the heating process and the quenching process, and/or a bottom rim forming process of forming a bottom rim around its whole circumference that projects outwards to the outer peripheral side surface of the bottom part of the can body after the above-described processes, (v) a filling and hermetic sealing process of filling food into the can body having beads and/or the bottom rim formed by the above-described processes and hermetically sealing by mounting a lid part onto the upper end surface of the can body and seaming it.

Further, in the (ii) heating process, it is preferable to heat the surface temperature of the can body to a temperature within a range of the melting temperature of the thermoplastic resin to +30° C., of the melting temperature.

Further, in the (ii) heating process, it is preferable to hold the surface temperature of the can body at the melting temperature of the thermoplastic resin or higher for 25 to 45 seconds.

Further, in the (iii) quenching process, it is preferable to cool the can body such that the surface temperature of the can body is 160° C. or lower at least within 20 seconds.

Further, it is preferable that the thermoplastic resin is a polyester resin mainly composed of a repeating unit of polyethylene terephthalate, and the melting temperature of the thermoplastic resin is 200 to 280° C.

Further, in the (v) filling and hermetically sealing process, it is preferable to fill the can body with food having chloride ion concentration of 4000 ppm or higher.

Effect of the Invention

According to the present invention, in manufacturing of a two-piece food can using a thermoplastic resin-coated metal sheet, after forming a bottomed cylindrical can body by drawing and ironing, by heating the can body at the melting temperature of the thermoplastic resin or higher for a predetermined time before forming uneven beads and/or a bottom rim and quenching the can body within a predetermined time after heating, the inner resin coating hardly peel off during the following process of forming uneven beads and/or the bottom rim. As a result, a two-piece food can having excellent corrosion resistance may be obtained.

BEST MODE FOR CARRYING OUT THE INVENTION

In the manufacturing method of a two-piece food can according to the present invention, a metal sheet coated with a thermoplastic resin is used as a can material. The thermoplastic resin is not limited in particular. The examples include polyester resins such as polyethylene terephthalate, polybutylene terephthalate, polyethylene naphthalate, ethylene terephthalate/isophthalate copolymer and butylene terephthalate/isophthalate copolymer, olefin resins such as polyethylene, polypropylene, ethylene-propylene copolymer and modified olefin, polycarbonate, nylon resin and a mixture thereof. As for thermoplastic resins, it is preferable that the polyester resin is mainly composed of a repeating unit of ethylene terephthalate. Moreover, as a copolymerization component other than terephthalic acid and ethylene glycol, for example, less than 25 mol % of isophthalic acid, adipic acid, sebacic acid and the like in dicarboxylic acid component, or, for example, less than 25 mol % of diethylene glycol, butanediol, 1,4-cyclohexanedimethanol and the like in diol component may be contained. Further, the melting temperature of the thermoplastic resin is preferably 200 to 280° C., and more preferably 220 to 250° C.

A metal sheet as a substrate is not limited in particular, and metal sheets generally used for manufacturing a can may be used. The examples include aluminum alloy sheet, tin-plated steel sheet, nickel-plated steel sheet, electrolytic chromic acid treated steel sheet, zinc-plated steel sheet and the like. When steel sheets are used as the metal sheet, the forming force at the formation of uneven beads and/or the bottom rims is greater than that of aluminum alloy sheets, and the inner resin coating is easier to peel off. However, since the present invention prevents peeling off of such resin coatings and thereby obtains improved corrosion resistance, it is effective in manufacturing two-piece food cans using steel sheets in particular. Further, the thickness of the metal sheet is not limited in panicular, too. However, as thinning of can bodies are desired recently, the thickness of the substrate is usually approximately 0.1 to 0.3 nm. At least one side of the metal sheet may be coated with the thermoplastic resin, and both sides may be coated. The thickness of the thermoplastic resin layer coated onto the surface of the metal sheet may be within a range of 5 to 50 μm. For example, when both sides of the metal sheet are coated with the thermoplastic resin, the thickness of one side of the resin-coated layer is usually approximately 10 to 25 μm (both sides in total of 20 to 50 μm).

Figure 1:
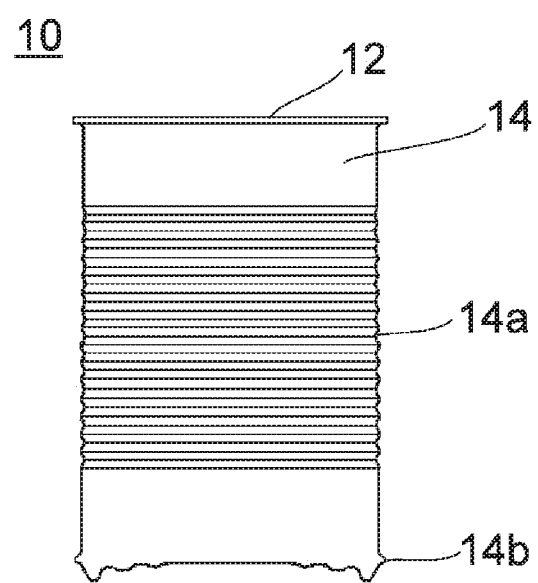
FIG. 1 shows an example of a two-piece food can manufactured by the method of the present invention.

In FIG. 1, one example of a two-piece food can manufactured by the method of the present invention is shown. The two-piece food can 10 is integrated by mounting an upper lid 12 onto the upper end surface of a bottomed cylindrical can body 14 and seaming it. Approximately at the center of the can body 14a, annular uneven beads are provided around the entire outer periphery surface, and at the outer periphery surface of the bottom surface, a bottom rim 14b is provided such that it projects outwards.

Figure 2:
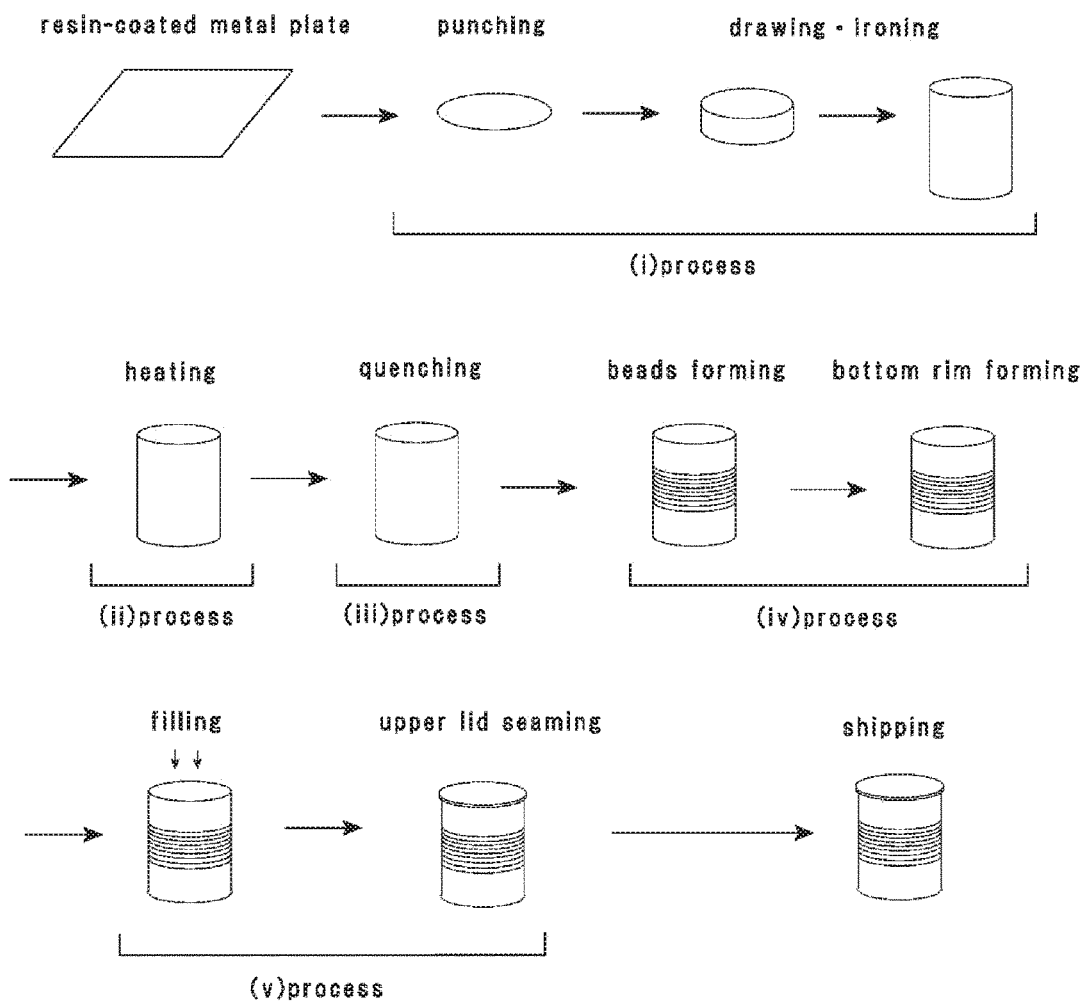
FIG. 2 shows a schematic drawing of an embodiment of the manufacturing method of the two-piece food can of the present invention.

In FIG. 2, a schematic drawing of one embodiment of the method of manufacturing a two-piece food can of the present invention is shown.

In the method of the present invention, as (i) process, first of all, a metal sheet coated with a thermoplastic resin is punched into an approximately circular shape. By pressing a suitable sized mold (a punch and a dice) in a vertical direction and repeating such pressing to the punched circular metal sheet, so-called drawing and ironing, a bottomed cylindrical can body that the body part and the bottom part are formed integrally is formed. When only one side of the metal sheet is coated with the thermoplastic resin, drawing and ironing is applied by pressing the punch to the resin-coated surface, such that the resin-coated surface will become the inner surface.

To the bottomed cylindrical can body obtained by (i) process, (ii) heating process and (iii) quenching process are applied before (iv) uneven beads and/or bottom rim forming. Here, since significantly large force is applied to the resin that is coated onto the inner surface of the metal sheet and the resin is extended to the vertical direction together with the metal sheet by (i) process, in the obtained can body, there are cases that adherence of the resin and the metal sheet may be lowered already or orientation and strain may occur within the resin. If uneven beads and/or bottom rims forming process is performed in such state, the adherence will be lowered even more, and the resin layer becomes easier to peel off. Further, in case of food cans containing food having relatively high concentration of salt, unlike ordinary cans for beverage which hardly contain salt, only a small amount of peeling off of the resin layer or the adherence lowered part may cause immediate corrosion.

Therefore, in the present invention, after (i) process, the bottomed cylindrical can body is heated and held in a state as the surface temperature of the can body is at the melting temperature of the thermoplastic resin or higher for at least 20 seconds or more as (ii) process. Here, the melting temperature of the thermoplastic resin may be determined by HS K7121. That is, by using a differential thermal analyzer (DTA) or a differential scanning calorimeter (DSC), a specimen consisted of adequate amount of the thermoplastic resin is heated to a temperature that is about 20° C. higher than the melting peak ending point at heating rate of about 10° C. per minute and melted, and a DTA or DSC curve is depicted. The temperature at the peak of the melting peak is the melting temperature of the thermoplastic resin. Here, when plurality of melting peaks are present, in the present invention, the temperature of the melting peak that is the highest in the high temperature side is adopted as the melting temperature.

As the heating process of (ii) process, when the surface temperature of the can body does not reach the melting temperature of the thermoplastic resin, desired corrosion resistance for a two-piece food can may not be obtained because peeling off and orientation or strain of the resin caused by (i) process would not sufficiently disappear. Further, as the surface temperature of the can body, it is preferable to heat the surface of the can body within the range of the melting temperature to +30° C. of the melting temperature. When it is higher than the melting temperature by 30° C. or higher, the thermoplastic resin may be decomposed and deteriorated.

Further, as for the heating time of (ii) process, it is necessary to hold the surface temperature of the can body at the melting temperature or higher for at least 20 seconds or more. If the heating and holding time is shorter than 20 seconds, peeling off and orientation or strain of the resin caused by (i) process would not sufficiently disappear. In particular, for a two-piece food can like the present invention, the center part of the can body where beads are formed or the bottom part of the can body where the bottom rim is formed are important, and heating and holding time less than 20 seconds is not sufficient to repair the resins at such parts. Moreover, it is desirable that the heating and holding temperature at the melting temperature or higher is within 25 to 45 seconds. When the heating and holding time is too long, as the temperature of the can body rises excessively, the resin may be decomposed, and impact resistance may be lowered due to reduction of molecular weight.

Accordingly, in (ii) process, for example, when a metal sheet coated with polyester resin having melting temperature of 240° C. is used as a can material, it is necessary to hold at 240° C. or higher for 20 seconds or more, and more preferably, it is desirable to hold for 30 to 40 seconds within the range of 240 to 255° C. The heating process of (ii) process is not limited in particular. For example, can bodies may be placed on a conveyor for transportation, and let them pass through the heating oven provided in the passage. According to the setting temperature of the heating oven and the transportation rate of the conveyor, the heating temperature and time can be adequately adjusted to fall within their suitable range.

Subsequently, as for (iii) process, the can body is quenched such that the surface temperature of the can body is Y ° C. or lower at least within X seconds represented by the formula shown below.

$$X(\text{second(s)})=(T_{peak}(°\text{ C.})-Y(°\text{ C.}))/5$$

$T_{peak}$(° C.): the highest temperature of the can body surface at the heating process Y(° C.): the crystallization ending temperature of the thermplastic resin Here, the crystallization ending temperature of the thermoplastic resin may be determined by JIS K7121, using a differential thermal analyzer (DTA) or a differential scanning calorimeter (DSC), as described for the melting temperature.

That is, a specimen consisted of adequate amount of the thermoplastic resin is heated to a temperature that is about 30° C. higher than the temperature at the melting peak ending point and melted. After holding the specimen for 10 minutes at that temperature, the specimen is cooled to a temperature that is about 50° C. lower than the temperature at the crystallization peak ending point at a cooling rate of 5° C. per minute or 10° C. per minute, and a DTA or DSC curve is depicted. Then, the temperature at the intersection point of the straight line, which is the baseline in the low temperature side extended to the high temperature side, and the tangent line, which is drawn at the point where the gradient is at the maximum on the curved line in the lower temperature side of the crystallization peak, is set as the (extrapolation) crystallization ending temperature of the thermoplastic resin. When plurality of crystallization peaks are present due to a use of a resin mixture, in the present invention, the temperature that is the lowest in the low temperature side is adopted as the crystallization ending temperature.

The quenching method is not limited in particular. For example, the can body may be cooled by exposing it under room temperature atmosphere instantaneously. It also may be immersed into a solvent such as water as a cooling solvent, or may be sprayed with such solvents. If it takes a long time to cool the surface temperature of the can body to the crystallization temperature or lower, the resin begin to crystallize partially, and the interface of the crystal become weak and tend to cause cracks. Therefore, the corrosion resistance and impact resistance is deteriorated. For example, generally, polyethylene terephthalate begin to crystallize at around 150 to 200° C. Accordingly, although the resin is heated to the melting temperature or higher and crystallize temporarily, when it is held for a long time at a temperature around the crystallization temperature at cooling, it gradually re-crystallizes. On the other hand, by cooling to the crystallization ending temperature or lower within a short time by quenching, re-crystallization is suppressed, and the resin is solidified maintaining almost the amorphous state at melting. Therefore, good corrosion resistance and impact resistance may be obtained.

Further, as for the cooling time of (ii) process, it is necessary to quench the can body to Y ° C. (the crystallization ending temperature of the thermoplastic resin) or lower at least within X seconds(=(the highest temperature (° C.) of the can body surface at the heating process)—the crystallization ending temperature of the thermoplastic resin (° C.)/5). When the time required for cooling the can body to the crystallization ending temperature or lower is longer than X seconds, the resin begin to crystallize, and the corrosion resistance and impact resistance may be deteriorated. As one example, when the highest temperature of the can body surface at the heating process is 265° C. and the crystallization ending temperature is 165° C., as (265-165)/5=20, the can body is quenched to 165° C. or lower within 20 seconds after the heating process. The elapsed time after heating is the time calculated from the highest temperature reaching time of the can body surface by heating. Further, in the method of the present invention, it is more desirable to quench to 160° C. or lower within 20 seconds.

In the method of the present invention, after (i) and (ii) processes, it comprises uneven beads and/or a bottom rim forming process as (iv) process. As shown as 14a in FIG. 1, uneven beads are, for example, are uneven parts of grooves formed around the whole circumference of the side surface of the body part of the can body. The method of forming uneven beads is not limited in particular. Usually, the can body part is welded with pressure by placing it in between a receiving mold, which is set at the inner face side of the can body, and a pressing mold, which is set at the outer face side, and groove-shaped beads are formed thereby. Here, at welding the can body part with pressure by the receiving mold and the pressing mold to form beads, since not only a significant large forming force is applied to the metal surface, but also the surface state becomes uneven and the direction of the force being applied thereto will not be fixed, the resin becomes easier to peel off during formation. Or, there are problems that as the thickness of the resin may become uneven or partially weak due to the pressure applied from unfixed directions, the corrosion resistance and the impact resistance is deteriorated. In particular, it may not be a problem for cans for beverages having less salt, but for food cans used for food having large salt content, more specifically for food having chloride ion concentration of 4000 ppm or higher (as for food having large salt content, there is food having chloride ion concentration of 15000 ppm), a slight insufficient adhesion of the resin may cause immediate corrosion. In addition, as for cans having uneven beads, since the contact area with food become larger, it can be said that corrosion may occur easily.

Further, as shown as 14b in FIG. 1, the bottom rim is a projected part provided to project out to the outer direction around the whole circumference of the bottom part of the can body. Generally in two-piece cans, since the outer peripheral diameter of the upper lid that is mounted on the upper face projects outwards, the bottom rim is provided to solve the deviation of the outer peripheral diameter of the two-piece can by extending the outer peripheral diameter of the bottom part outwards, such that the diameter of the bottom part and the upper lid will become the same. Here, the method of forming the bottom rim is not limited in particular. Similar to the forming of uneven beads, usually, the can body part is welded with pressure by placing it in between a receiving mold, which is set at the inner face side, and a pressing mold, which is set at the outer face side, and the projected part that projects outwards is formed. Therefore, similar to the forming of uneven beads, the corrosion resistance may be deteriorated due to the peeling off of the resin.

In contrast, in the method of the present invention, by performing the above-described (ii) heating process and (iii) quenching process before performing (iv) uneven beads and/or bottom rim forming process, in the resin coated onto the metal sheet surface, strains disappear and the resin will become an amorphous state having further process fol-lowability. Therefore, peeling off of the resin hardly occurs by the following (iv) uneven beads and/or bottom rim forming process, such that two-piece food can having excellent corrosion resistance may be obtained. In the method of the present invention, either uneven beads or the bottom rim are to be formed, or both of them may be formed. The number of uneven beads are not limited in particular. In general, about 2 to 20 beads are formed in the area of approximately 20 to 80% of the can body height.

To the can body provided with uneven beads and/or the bottom rim by (iv) process, filling and hermetic sealing of food is performed as (v) process. The filling and hermetic sealing may be done by the conventional technique. Usually, the upper end face of the can body is cut uniformly by trimming in advance, and a flange is formed by a flanger. After washing and sterilizing, food is filled. Then, an upper lid that is manufactured separately is mounted onto the upper end face of the can body and is hermetically sealed by seaming it with a seamer. Then, heat sterilization at predetermined temperature and time is performed as needed. The kind of food is not limited in particular. However, the present invention is effective to food having high salt content, and in particular, to those having chloride ion concentration of 4000 ppm or higher.

EXAMPLES

In the following, the present invention is described in further details with examples of the method of manufacturing a two-piece food can according to the present invention, but the present invention is not limited thereto.

Example 1-1

<Thermoplastic Resin-Coated Metal Sheet>

| Inner face resin layer (thickness of 20 μm) | |
|---|---|
| Polyethylene terephthalate/isophthalate (Isophthalic acid 2 mol % copolymer) | 80% by mass |
| Polybutylene terephthalate | 20% by mass |
| Melting temperature*: | 245° C. |
| Crystallization peak temperature*: | 175° C. |
| Crystallization ending temperature*: | 165° C. |
| Metal sheet (thickness of 0.23 mm) | |
| Chromium-plated steel sheet (TFS) | |

| Outer face resin layer (thickness of 20 μm) | |
|---|---|
| Polyethylene terephthalate/isophthalate (Isophthalic acid 2 mol % copolymer) | 100% by mass |
| Melting temperature*: | 249° C. |

*determined by JIS K7121.

Figure 3:
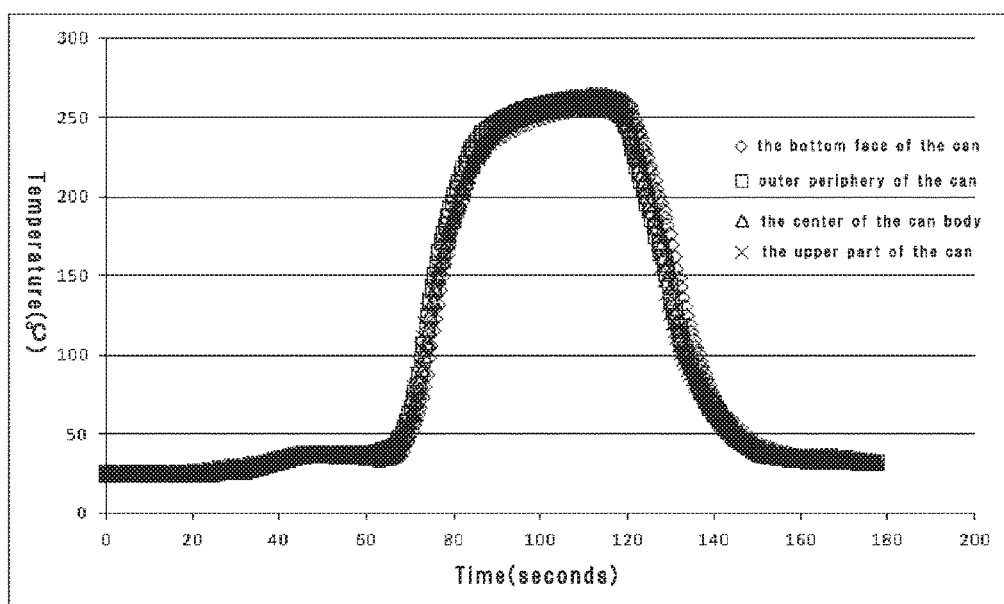
FIG. 3 shows the temperature change of the surface temperature of each parts of the can body in the heating process and the quenching process of Example 1.

A thermoplastic resin-coated metal sheet of above-described compositions is punched into a shape having diameter of 179 mm, drawn and ironed, and formed into a bottomed cylindrical can body having an inner diameter of 73.3 mm and a height of 123 mm (i process). Then, the can body is placed onto a conveyor and transported to pass through the heating oven at a predetermined speed. The set temperature and the transportation speed of the conveyor is adjusted in order to hold the temperature of the can body surface higher than the melting temperature of the inner face resin layer (245° C.) for about 30 seconds (ii process). In FIG. 3, the temperature change of the surface temperature of each parts of the can body in the heating and quenching process of Example 1 is shown. To be more specific, the holding time at 245° C. or higher was 30 seconds at the bottom face of the can, 30 seconds at the lower outer periphery of the can (bottom rim forming area), 27.5 seconds at the center of the can body (beads forming area), 24.5 seconds for the upper part of the can, and the average was 28 seconds. By placing the can body under ordinary temperature atmosphere immediately after passing through the heating oven, the can body is quenched so that the surface temperature will be the crystallization ending temperature or lower of the inner face resin layer (165° C.) at least within about 20 seconds after heating (iii process). Here, the highest temperature of the can body surface at heating process is 264.2° C. and the crystallization ending temperature is 165° C. Therefore, (264.2−165)/5=19.8 seconds. From FIG. 3, the time required to cool the can body to 165° C. or lower from the time of the highest temperature of the can body surface is 17.0 seconds at the bottom face of the can, 19.5 seconds at the lower outer periphery of the can (bottom rim forming area), 17.0 seconds at the center of the can body (beads forming area), 16.5 seconds at the upper part of the can, and the average was 17.5 seconds.

Next, to the can body obtained by the above-described processes, beads were formed by welding with pressure by pressing molds from inside and outside of the can body (iv process). The forming range of the beads is set at a pitch of 4.3 mm and a depth of 0.6 mm, and 15 beads were formed within the range of 30 to 90.2 mm of the can height. Similarly, the bottom rim was formed by welding with pressure by pressing molds from inside and outside at the bottom part of the can body (iv process). The bottom rim was provided to project 0.5 mm outwards than the outer diameter of the can body. Then, the upper end face of the can body is cut uniformly by trimming, and a flange is formed by a flanger. After washing and sterilizing, commercially available tomato sauce (chloride ion concentration: about 4000 ppm) was filled under sterilized environment, and an upper lid (diameter of 82 mm) that was manufactured separately was mounted onto the flange and hermetically sealed by seaming it with a seamer (v process). Then, it was sterilized by heating at 112° C. for 12 minutes, and a two-piece can filled with food was obtained.

Example 2

Other than setting the time required to lower the temperature to 165° C. or lower from the highest temperature (about 265° C.) to about 30 seconds in average of each part of the can body in the above-described (iii) quenching process, in the same way as in Example 1, a two-piece can filled with food was obtained.

Example 3

Other than setting the time required to lower the temperature to 165° C. or lower from the highest temperature (about 265° C.) to about 60 seconds in average of each part of the can body in the above-described (iii) quenching process, in the same way as in Example 1, a two-piece can filled with food was obtained.

Example 4

Other than setting the highest temperature of the can body surface to about 240° C. (the holding time at the temperature higher than the melting temperature of the thermoplastic resin (245° C.) is zero) in the above-described (ii) heating process, in the same way as in Example 1, a two-piece can filled with food was obtained.

Example 5

Other than setting the time required to lower the temperature to 165° C. or lower from the highest temperature (about 240° C.) to about 30 seconds in average of each part of the can body in the above-described (iii) quenching process, in the same way as in Example 4, a two-piece can filled with food was obtained.

Example 6

Other than setting the time required to lower the temperature to 165° C. or lower from the highest temperature (about 240° C.) to about 60 seconds in average of each part of the can body in the above-described (iii) quenching process, in the same way as in Example 4, a two-piece can filled with food was obtained.

Example 7

Other than not performing the above-described (ii) and (iii) process at all, in the same way as in Example 1, a two-piece can filled with food was obtained.

The two-piece cans filled with food of Examples 1 to 7 obtained as described above were kept for 4 weeks at 38° C., and the internal corrosion state for each parts of the can (the upper part, beads, the bottom rim and the bottom face) were evaluated. Further, 3 identical cans were made respectively for each examples, and each of them were evaluated. The evaluation results are shown below. The evaluation criteria is as follows.

<State of Corrosion>

◎: No corrosion
○: A slight corrosion of a depth of 1% or less
□: Corrosion of a depth of 1 to 10%
◇: Corrosion of a depth of 10 to 25%
△: Corrosion of a depth of 25 to 50%

TABLE 1

|  | State of Corrosion | | | |
| --- | --- | --- | --- | --- |
|  | the upper part | beads | the bottom rim | the bottom face |
| Example 1 | ◎◎◎ | ○○○ | ○○○ | ◎◎◎ |
| Example 2 | ◎◎◎ | □□□ | □□□ | ◎◎◎ |
| Example 3 | ◎◎◎ | ◇◇◇ | △△△ | ○○○ |
| Example 4 | ○○○ | □□□ | □□□ | ◎◎◎ |
| Example 5 | ○○○ | □□□ | ◇◇◇ | ○○○ |
| Example 6 | ○○○ | ◇◇◇ | △△△ | ○○○ |
| Example 7 | ○○○ | ◇◇◇ | △△△ | ○○○ |

As shown in table 1 above, the two-piece can filled with food of Example 1 that was held for about 28 seconds at 245° C. or higher, which is the melting temperature of the thermoplastic resin coated onto the inner face of the can body, as (ii) heating process and quenched to 165° C. (the crystallization ending temperature) or lower within about 18 seconds from the time of the highest temperature (about 265° C.) of the can body surface as (iii) quenching process before forming beads and/or bottom rims, only slight corrosion could be found in the inner face at the beads and the bottom rim after 4 weeks of storage. The state of corrosion was good overall.

In contrast, in Examples 2 and 3 that required about 30 seconds and about 60 seconds to lower the temperature to 165° C. (the crystallization ending temperature) or lower from the time of the highest temperature (about 265° C.) after the heating process, corrosion of a depth of about 1 to 25% particularly at the inner face of the beads and the bottom rims occured. Further, in Examples 4 to 6 that their heating temperature had not reached the melting temperature of the thermoplastic resin (245° C.), sufficient corrosion resistance could not be obtained particularly at the inner face of the beads and the bottom rims. Moreover, in Example 7 that (ii) heating and (iii) quenching process had not been performed at all, significant corrosion occurred particularly at the inner face of the beads and the bottom rims.

Other manufacturing examples of the present invention are shown below, but the present invention is not limited thereto.

Manufacturing Example 1

<Thermoplastic Resin-Coated Metal Sheet>

| Inner face resin layer (thickness of 18 μm) | |
| --- | --- |
| Polybutylene terephthalate | 60% by mass |
| Polyethylene terephthalate | 40% by mass |
| Melting temperature*: | 217° C. (PBT), 251° C. (PET) |
| Crystallization peak temperature*: | 175° C. |
| Crystallization ending temperature*: | 164° C. |
| Metal sheet (thickness of 0.23 mm) | |
| Nickel-plated steel sheet | |

| Outer face resin layer (thickness of 10 μm) | |
| --- | --- |
| Polyethylene terephthalate/isophthalate (Isophthalic acid 1.5 mol % copolymer) | 100% by mass |
| Melting temperature*: | 247° C |

*determined by HS K7121.

By using the above-described thermoplastic resin-coated metal sheet and performing (i) to (v) processes in the same way as Example 1, two-piece cans filled with food having same dimensions were obtained. The holding time at 251° C. or higher, which is the melting temperature (the melting peak that is the most in the high temperature side) of the inner face resin layer at (ii) heating process, was 25.5 seconds in average. Further, in (iii) quenching process, the time required for lowering the surface temperature to 164° C. or lower, which is the crystallization ending temperature, from the time of the highest temperature (about 265° C.) after heating was 18.0 seconds in average.

In the two-piece food cans obtained by the manufacturing example 1 as shown above, after 4 weeks of storage at 38° C., corrosion was hardly caused at the inner face of the beads and bottom rims, and showed excellent corrosion resistance.

Manufacturing Example 2

<Thermoplastic Resin-Coated Metal Sheet>

| Inner face resin layer (thickness of 20 μm/upper layer 10 μm, bottom layer 10 μm) | |
| --- | --- |
| Upper layer (10 μm) | |
| Polybutylene terephthalate | 60% by mass |
| Polyethylene terephthalate | 40% by mass |
| Bottom layer (10 μm) | |
| Polyethylene terephthalate/isophthalate (Isophthalic acid 10 mol % copolymer) | 70% by mass |
| Upper layer component | 30% by mass |
| Melting temperature*: | 220° C. (PBT), 249° C. (PET), 242° C. (I-PET) |
| Crystallization peak temperature*: | 178° C. |
| Crystallization ending temperature*: | 169° C. |
| Metal sheet (thickness of 0.23 mm) | |
| Chromium-plated steel sheet (IFS) | |

| Outer face resin layer (thickness of 12 μm) | |
| --- | --- |
| Polybutylene terephthalate | 60% by mass |
| Polyethylene terephthalate | 40% by mass |
| Melting temperature*: | 219° C. (PBT), 247° C. (PET) |

*determined by JIS K7121.

By using the above-described thermoplastic resin-coated metal sheet and performing (i) to (v) processes in the same way as Example 1, two-piece cans filled with food having same dimensions were obtained. The holding time at 249° C. or higher, which is the melting temperature (the melting peak that is the most in the high temperature side) of the inner face resin layer at (ii) heating process, was 27 seconds in average. Further, in (iii) quenching process, the time required for lowering the surface temperature to 169° C. or lower, which is the crystallization ending temperature, from the time of the highest temperature (about 265° C.) after heating was 17.5 seconds in average.

In the two-piece food cans obtained by the manufacturing example 2 as shown above, after 4 weeks of storage at 38° C., corrosion was hardly caused at the inner face of the beads and bottom rims, and showed excellent corrosion resistance.

DESCRIPTION OF REFERENCE NUMBERS

10: Two-piece food can
12: Upper lid
14: Can body (14a: uneven beads, 14a: bottom rim)

What is claimed is:
1. A method of manufacturing a two-piece can with high chloride concentration food, the can being filled with food having a chloride ion concentration of 4000 ppm or higher, obtained by using a thermoplastic resin-coated metal sheet and having uneven beads and/or a bottom rim formed onto the can body, wherein the method comprising;
(i) a can body forming process of punching a metal sheet that a thermoplastic resin is coated at least on one side into an approximately circular shape, drawing and ironing the metal sheet such that the resin-coated surface becomes the inner surface, and forming a bottomed cylindrical can body that the body part and the bottom part are formed integrally,
(ii) a heating process of heating the bottomed cylindrical can body formed by the above-described process and holding the surface temperature of the can body at the melting temperature of the thermoplastic resin or higher for at least 20 seconds or more,
(iii) determining a crystallization ending temperature of the thermoplastic resin,
(iv) a quenching process, after the heating process, of cooling the can body such that the surface temperature of the can body is Y ° C. or lower at least within X seconds represented by the formula shown below,

$$X(\text{second(s)}) = (T_{peak}(° C.) - Y(° C.))/5$$

$T_{peak}$ (° C.): the highest temperature of the can body surface at the heating process Y (° C.): the crystallization ending temperature of the thermoplastic resin (v) a bead forming process of forming one or more annular uneven beads around its whole circumference of the side surface of the body part of the can body after the heating process and the quenching process, and/or a bottom rim forming process of forming a bottom rim around its whole circumference that projects outwards to the outer peripheral side surface of the bottom part of the can body after the above-described processes, and (vi) a filling and hermetic sealing process of filling food having a chloride ion concentration of 4000 ppm or higher into the can body having beads and/or the bottom rim formed by the above-described processes and hermetically sealing by mounting a lid part onto the upper end surface of the can body and seaming it.

2. The method of manufacturing a two-piece food can according to claim 1, wherein the surface temperature of the can body is heated to a temperature within a range of a melting temperature of the thermoplastic resin to +30° C. of the melting temperature in the (ii) heating process.

3. The method of manufacturing a two-piece food can according to claim 2, wherein the surface temperature of the can body is held at the melting temperature of the thermoplastic resin or higher for 25 to 45 seconds in the (ii) heating process.

4. The method of manufacturing a two-piece food can according to claim 2, wherein the can body is quenched such that the surface temperature of the can body is 160° C. or lower at least within 20 seconds in the (iv) quenching process.

5. The method of manufacturing a two-piece food can according to claim 2, wherein the thermoplastic resin is a polyester resin mainly composed of a repeating unit of polyethylene terephthalate, and the melting temperature of the thermoplastic resin is 200 to 280° C.

6. The method of manufacturing a two-piece food can according to claim 1, wherein the surface temperature of the can body is held at the melting temperature of the thermoplastic resin or higher for 25 to 45 seconds in the (ii) heating process.

7. The method of manufacturing a two-piece food can according to claim 6, wherein the can body is quenched such that the surface temperature of the can body is 160° C. or lower at least within 20 seconds in the (iv) quenching process.

8. The method of manufacturing a two-piece food can according to claim 6, wherein the thermoplastic resin is a polyester resin mainly composed of a repeating unit of polyethylene terephthalate, and the melting temperature of the thermoplastic resin is 200 to 280° C.

9. The method of manufacturing a two-piece food can according to claim 1, wherein the can body is quenched such that the surface temperature of the can body is 160° C. or lower at least within 20 seconds in the (iv) quenching process.

10. The method of manufacturing a two-piece food can according to claim 9, wherein the thermoplastic resin is a polyester resin mainly composed of a repeating unit of polyethylene terephthalate, and the melting temperature of the thermoplastic resin is 200 to 280° C.

11. The method of manufacturing a two-piece food can according to claim 1, wherein the thermoplastic resin is a polyester resin mainly composed of a repeating unit of polyethylene terephthalate, and the melting temperature of the thermoplastic resin is 200 to 280° C.

* * * * *